US006363439B1

United States Patent
Battles et al.

(10) Patent No.: US 6,363,439 B1
(45) Date of Patent: Mar. 26, 2002

(54) SYSTEM AND METHOD FOR POINT-TO-POINT SERIAL COMMUNICATION BETWEEN A SYSTEM INTERFACE DEVICE AND A BUS INTERFACE DEVICE IN A COMPUTER SYSTEM

(75) Inventors: John D. Battles, Tomball; Paul B. Rawlins, Spring; Robert Allan Lester; Patrick L. Ferguson, both of Houston, all of TX (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 09/206,515

(22) Filed: Dec. 7, 1998

(51) Int. Cl.[7] .......................... G06F 13/14; G06F 13/20
(52) U.S. Cl. .......................... 710/36; 710/45; 710/106; 710/107; 710/110; 710/117
(58) Field of Search ................................ 710/110, 106, 710/107, 117, 36, 45

(56) References Cited

U.S. PATENT DOCUMENTS

| | | | | |
|---|---|---|---|---|
| 4,550,402 A | * | 10/1985 | Gable et al. .................. 370/85 |
| 5,257,393 A | * | 10/1993 | Miller ........................ 395/800 |
| 5,528,765 A | * | 6/1996 | Milligan ...................... 395/287 |
| 5,586,265 A | * | 12/1996 | Beukema ................ 395/200.09 |
| 5,696,911 A | * | 12/1997 | Fredriksson ................ 395/286 |
| 5,987,555 A | * | 11/1999 | Alzien et al. ................ 710/129 |
| 6,064,626 A | * | 5/2000 | Stevens ........................ 365/233 |
| 6,091,714 A | * | 7/2000 | Sensel et al. ................ 370/260 |

* cited by examiner

Primary Examiner—Thomas Lee
Assistant Examiner—Rehana Perveen
(74) Attorney, Agent, or Firm—Conley, Rose & Tayon, PC; Robert C. Kowert

(57) ABSTRACT

A point-to-point serial communication link between a system interface unit and a peripheral bus interface unit is provide. The system bus interface unit may interface between a CPU bus and a peripheral bus, such as the PCI bus, and may be referred to as a north bridge. The system interface unit may also interface to main memory and to an advanced graphics port. The peripheral bus interface unit may interface between a first peripheral bus, such as the PCI bus, and a second peripheral bus, such as an ISA bus, and may be referred to as a south bridge. The serial communication link between the system interface unit and the bus interface unit may be a one wire serial bus that uses a bus clock from the first peripheral bus as a timing reference. This clock may be the PCI clock. The serial communication link may use a single pin on the system interface unit and a single pin on the bus interface unit to transfer commands between the interface units. A pull-up device may be provided on the serial communication link to maintain a high voltage level on the link when it is not being driven by one of the bus interface units. The north bridge and south bridge may alternate between sending and receiving commands across the

57 Claims, 5 Drawing Sheets

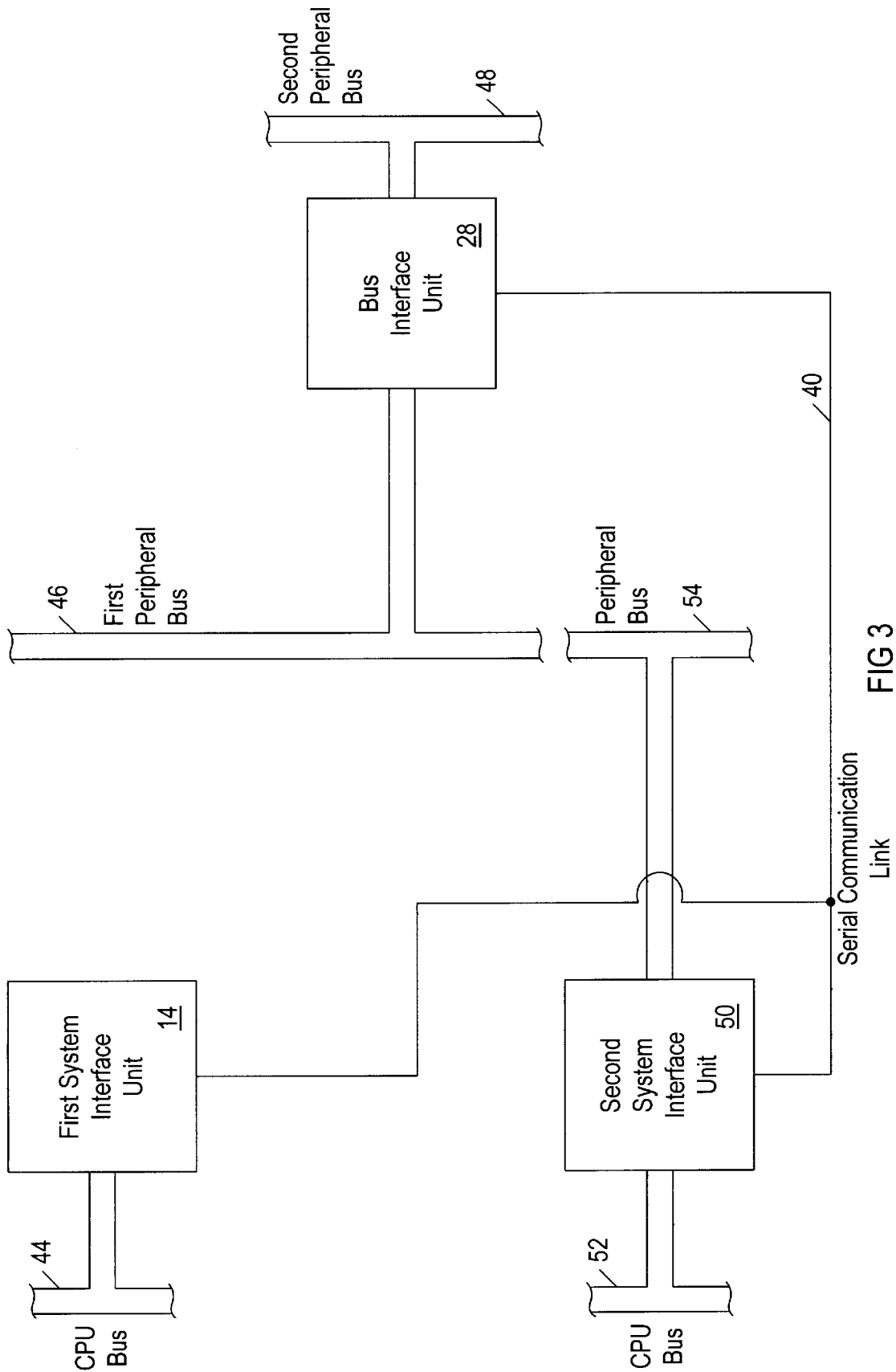

SYSTEM AND METHOD FOR POINT-TO-POINT SERIAL COMMUNICATION BETWEEN A SYSTEM INTERFACE DEVICE AND A BUS INTERFACE DEVICE IN A COMPUTER SYSTEM

BACKGROUND OF THE INVENTION

1. Field of the Invention

This disclosure relates to a computer and, more particularly, to a point-to-point serial communication link between bus interface units in a computer system.

2. Description of the Related Art

A computer may have multiple buses connected between the CPUs and numerous input/output devices. The buses may have dissimilar protocols depending on which devices they link. For example, a CPU local bus connected directly to the CPU preferably transfers data at a faster rate than a peripheral bus connected to slower input/output devices. A mezzanine bus may be used to connect devices arranged between the CPU local bus and the peripheral bus. The peripheral bus can be classified as, for example, an industry standard architecture ("ISA") bus, an enhanced ISA ("EISA") bus or a microchannel bus. The mezzanine bus can be classified as, for example, a peripheral component interconnect ("PCI") bus to which higher speed input/output devices may be connected.

Coupled between the various buses are bus interface units. According to somewhat known terminology, the bus interface unit coupled between the CPU bus and the mezzanine bus (e.g. PCI bus) is often termed the "north bridge". Similarly, the bus interface unit between the PCI bus and the peripheral bus is often termed the "south bridge".

The north bridge, henceforth termed a system interface unit, serves to link specific buses within the hierarchical bus architecture. Preferably, the system interface unit couples data, address and control signals forwarded between the CPU local bus, the PCI bus and the memory bus. Accordingly, the system interface unit may include various buffers and/or controllers situated at the interface of each bus linked by the interface unit. In addition, the system interface unit may transfer data to/from a dedicated graphics bus, and therefore may include an advanced graphics port ("AGP"). As a host device, the system interface unit may support both the PCI graphics transfers on the AGP (e.g., graphics-dedicated transfers associated with PCI, henceforth is referred to as a graphics component interface, or "GCI"), as well as AGP extensions to the PCI protocol.

Thus, two or more bus interface units may be used in a computer system to interface between the hierarchy of buses. A computer system may also implement various power management states. Such power management states may be specified by, for example, the advanced configuration and power interface (ACPI) specification. Circuitry to implement the system and power management functions may be included in one or more of the bus interface units. In order to maintain synchronization within the computer system between various system and power management states, the bus interface units may need to communicate system and power management information between each other. For example, the power state of the CPU may be known to a system interface unit that interfaces to the CPU bus, but may not be directly observable by a bus interface unit that interfaces between peripheral buses. Thus, the system interface unit may need to communicate CPU power state information to the bus interface unit. Similarly, the bus interface unit may control the power management states of various system resources, such as memory. The bus interface unit may need to apprise the system interface unit of the power management states for the system resources.

SUMMARY OF THE INVENTION

A point-to-point serial communication link between a system interface unit and a peripheral bus interface unit is provided. The system bus interface unit may interface between a CPU bus and a peripheral bus, such as the PCI bus, and may be referred to as a north bridge. The system interface unit may also interface to main memory and to an advanced graphics port. The peripheral bus interface unit may interface between a first peripheral bus, such as the PCI bus, and a second peripheral bus, such as an ISA bus, and may be referred to as a south bridge. The serial communication link between the system interface unit and the bus interface unit may be a one wire serial bus that uses a bus clock from the first peripheral bus as a timing reference. This clock may be the PCI clock. The serial communication link may use a single pin on the system interface unit and a single pin on the bus interface unit to transfer commands between the interface units. A pull-up device may be provided on the serial communication link to maintain a high voltage level on the link when it is not being driven by one of the bus interface units.

After initializing the serial communication link, the system interface unit and the bus interface unit send commands back and forth over the serial communication link. The interface units alternate between which one is sending and which one is receiving commands. For example, the system interface unit may send a command to the bus interface unit followed by the bus interface unit sending a command to the system interface unit followed by the system interface unit sending a command to the bus interface unit and so forth. Thus, commands are sent back and forth in a ping pong type fashion. A one clock turnaround period may be used between commands where neither interface unit drives the serial communication link to avoid bus contention on the serial communication link. The devices may continue alternating commands until the first peripheral bus is reset. After a reset, the serial communication link may be initialized by a command sent from the system interface unit to the bus interface unit. After initialization, the interface units trade commands in the ping pong fashion described above. If an interface unit has no command pending, a NOP (no operation) command may be sent. The commands typically may communicate system or power management information.

Broadly speaking, a computer system is provided having a first system interface unit configured to interface a processor bus to a first peripheral bus. A bus interface unit is also provided and configured to interface the first peripheral bus to a second peripheral bus. A serial communication link is present between the first system interface unit and the bus interface unit. The first system interface unit and the bus interface unit are further configured to communicate with each other across the serial communication link. A graphics device may be coupled to the first system interface unit, and a display monitor for displaying images to a user of the computer system may be coupled to the graphics device. The first system interface unit and the bus interface unit may communicate with each other across the serial communication link by sending commands across the serial communication link. The first system interface unit and the bus interface unit may alternate after each command between which device is sending and which device is receiving a command.

The first system interface unit and the bus interface unit may synchronize sending and receiving commands across the serial communication link to a common clock reference. The common clock reference may be the bus clock for the first peripheral bus, e.g., the PCI clock. A turnaround period may exist following the sending of the command during which neither interface unit drives the serial communication link. Also, a pull-up device may be included on the serial communication link to pull the serial communication link to a high voltage when the serial communication link is not actively driven. The serial communication link may be a single, point-to-point connection between one conductor on the first system interface unit and one conductor on the bus interface unit. Thus, except for the one conductor, no other conductors besides the ones present for normal bus, e.g. PCI or ISA, operation may be required.

The serial communication link may be used to communicate system information between the interface units. The interface units may alternate sending and receiving commands across the serial communication link. The commands may include a command for the first system interface unit to communicate to the bus interface unit that a processor coupled to the processor bus is in a system management mode. Another command may communicate that the processor is not in the system management mode. Power management information may also be communicated. A command may be sent from the first system interface unit to communicate to the bus interface unit that a processor coupled to the processor bus is in a reduced or low-power state. The commands may also include a command for the bus interface unit to instruct the first system interface unit to place system memory coupled to the first system interface unit in a low-power mode. Another command may be used to instruct the system interface unit to bring the system memory out of the low-power mode.

The first system interface unit may arbitrate between a graphics bus and a first peripheral bus for access to the system memory. The first system interface unit may use a command on the serial communication link to communicate to the bus interface unit that this arbitration is masked. The first system interface unit may use another command to indicate to the bus interface unit that a device coupled to the first system interface unit is requesting service or access to the system memory. This command may be a device wake-up command and may also be used by the system interface unit to initialize the serial communication link after a reset.

An arbiter for the first peripheral bus may be included in the bus interface unit. A command may be used by the bus interface unit to communicate to the system interface unit that this arbiter has been parked, or granted, to the CPU bus. Similarly, a command may be used to indicate that the first peripheral bus is unparked.

A second system interface unit may also be included and connected to the serial communication link. The commands may include a command for the second system interface unit to communicate to the first system interface unit that bus arbitration performed by the second system interface unit is masked. The first system interface unit may use a command to indicate to the bus interface unit that bus arbitration by all system interface units is masked.

A method for communicating information between interface units in a computer system may include sending a first command from a system interface unit to a bus interface unit on a serial communication link between the bus interface units. The method may also include sending a second command from the bus interface unit to the system interface unit on the serial communication link after sending the first command. The method may include continuing to send commands between the system and bus interface units with the bus interface units alternating after each command between which interface unit is receiving and which is sending a command. The method may further include initializing the serial communication link after a reset by the system interface unit sending an initialization command to the bus interface unit.

The system interface unit may interface a processor bus to a first peripheral bus, and the bus interface the first peripheral bus to a second peripheral bus. The serial communication link may be synchronized to a common clock received by the system and bus interface units. In one embodiment, neither the system nor the bus interface units drive the serial communication link for one common clock period after each command is sent. The commands may be four bits in length.

A method for communicating information between bus interface units and a computer system may include placing a CPU in a low-power state and sending, on a serial communication link between the system and bus interface units, a CPU low-power command from the system interface unit to the bus interface unit. The system interface unit may be coupled to the CPU and the CPU low-power command may be used to inform the bus interface unit that the CPU is in the low-power state. The method may also include sending on the serial communication link, a memory-off command from the bus interface unit to the system interface unit to instruct the first interface unit to place system memory coupled to the first interface unit and a power down state.

The method may further include sending on the serial communication link a system management start command from the system interface unit to the bus interface unit. The system management start command may be used to inform the bus interface unit that the CPU is in a system management mode. Similarly, a system management stop command may be sent to inform the bus interface unit that the CPU is not in the system management mode.

A device wake-up command may be sent from the system interface unit to the bus interface unit to inform the bus interface unit that a device coupled to the system interface unit is requesting service. A memory-on command may be sent from the bus interface unit to the system interface unit to instruct the system interface unit to place system memory coupled to the system interface unit in a full power state. An arbiter-parked command may be sent from the bus interface unit to the system interface unit to inform the first interface unit a bus arbiter in the second interface unit is parked.

BRIEF DESCRIPTION OF THE DRAWINGS

Other objects and advantages of the invention will become apparent upon reading the following detailed description and upon reference to the accompanying drawings in which:

FIG. 3 is a block diagram of a serial communication link between a two system interface units and bus interface unit in a computer system;

Figure 1:
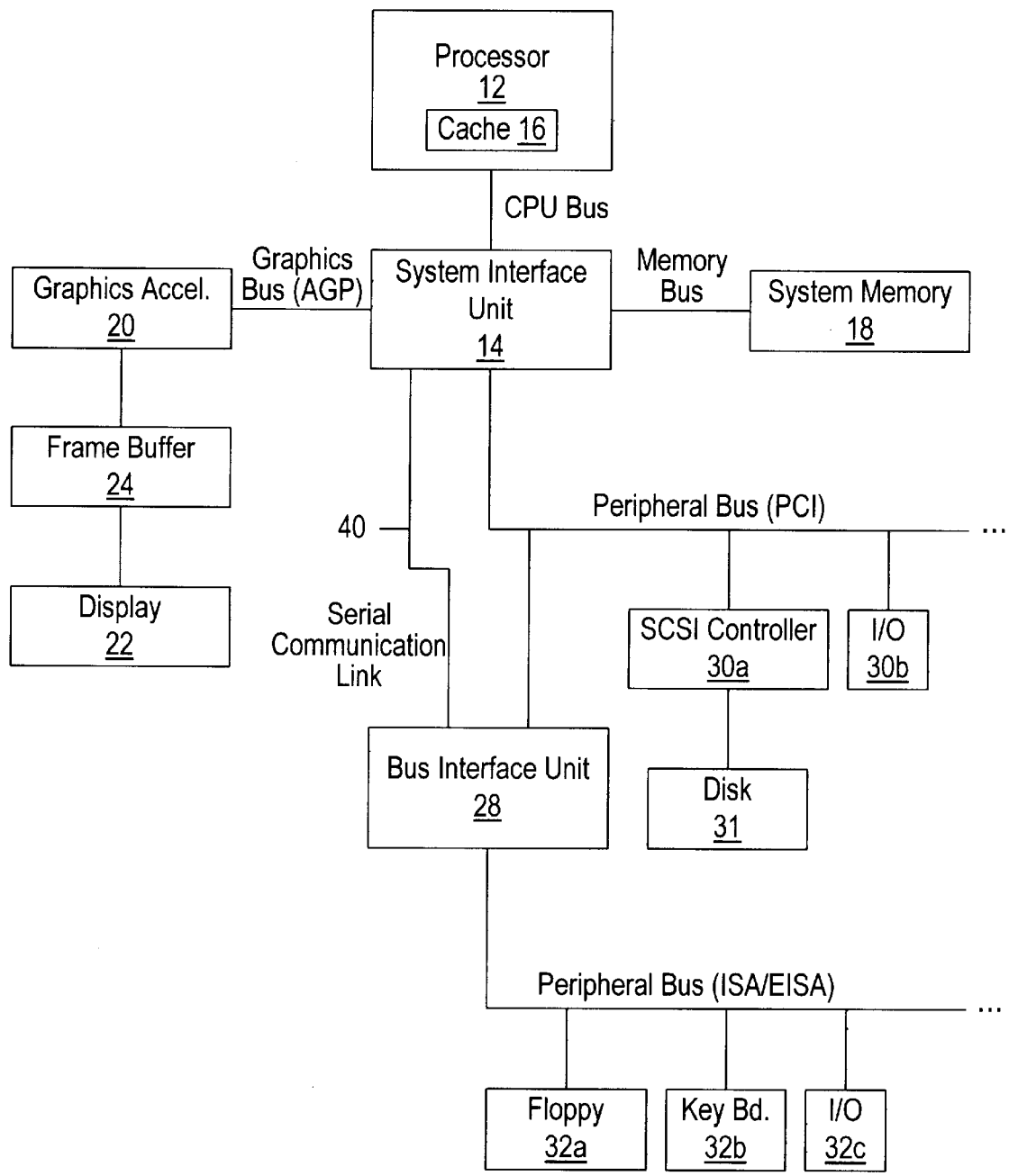
FIG. 1 a block diagram of a computer system comprising various buses and a serial communication link between a system interface unit and a bus interface unit.

While the invention may be modified and have alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF PREFERRED EMBODIMENTS

Turning now to the drawings, FIG. 1 illustrates a computer 10 having multiple buses, including a CPU bus, a mezzanine or PCI bus, and a peripheral bus or ISA/EISA bus. The CPU bus connects a CPU or processor (or processors) 12 to a system interface unit or north bridge 14. A cache memory 16 is preferably embodied within processor 12 and/or linked to processor 12 by the CPU bus. System interface unit 14 provides an interface between components located on different buses. System interface unit 14 preferably contains a memory controller which allows communication to and from system memory 18. A suitable system memory 18 may comprises dynamic random access memory (DRAM), extended data out dynamic random access memory (EDO DRAM) synchronous dynamic random access memory (SDRAM) or other suitable memory devices. System interface unit 14 may also include a graphics port to allow communication to a graphics accelerator 20. A graphics port, such as AGP, provides a high performance, component level interconnect targeted at three dimensional graphics display applications and is based on performance extensions or enhancements to PCI. AGP interfaces are generally standard in the industry, the description of which is available from Intel Corporation.

Generally speaking, AGP is physically, logically, and electrically independent of the PCI bus and is intended for the exclusive use of a display device 22 coupled to the graphics port (AGP) by a graphics accelerator 20 and local memory or frame buffer 24. The form and function of a typical graphics accelerator is generally known in the art to render three dimensional data structures which can be effectively shifted into and from system memory 18 to alleviate increased costs of local graphics memory. Frame buffer 24 is generally understood as any buffer which can capture a frame of memory, defined as a still picture. Display 22 is any electronic display upon which an image or text can be presented. A suitable display 22 includes a cathode ray tube ("CRT"), a liquid crystal display ("LCD"), etc.

System interface unit 14 is generally considered an application specific chip set or application specific integrated circuit ("ASIC") that provides connectivity to various buses, and integrates other system functions such as the main memory interface. System interface unit 14 may be referred to as a north bridge. System memory 18 may be the main memory and refers to a portion of the addressable memory that typically the majority of memory accesses target. System memory is accessed via system interface unit 14, and is typically considered the largest continuous memory space of computer 10.

Unlike the CPU bus which runs at speeds comparable to CPU 12, the PCI bus generally runs at speeds of, e.g., 33 MHz or lower, although it may run at higher speeds such as 60 or 66 MHz. Another bus interface unit 28 is coupled between two dissimilar peripheral buses (i.e., the PCI bus and the ISA/EISA bus). Bus interface unit 28 may be referred to as a south bridge. Similar to unit 14, unit 28 is an ASIC or group of ASICs that provide connectivity between various buses. Attributed to the PCI bus are input/output ("I/O") devices 30, one of which may be a SCSI controller link between, for example, a secondary disk drive and the PCI bus. I/O devices 30 generally operate at higher speeds than I/O devices 32, examples of which include a floppy disk drive, a keyboard, etc.

A serial communication link 40 is provide between system interface unit 14 and bus interface unit 28. Serial communication link 40 may be a single wire point-to-point connection between a conductor or pin on system interface unit 14 and a single conductor or pin on bus interface unit 28. Communications over serial communication link 40 may be synchronized to a common clock, such as a bus clock for a peripheral bus to which both the system interface unit 14 and the bus interface unit 28 are coupled. In a preferred embodiment, this common clock is the clock for the PCI bus. Serial communication link 40 may be used to communicate system and/or power management information between the interface units 14 and 28. This communication link may prove advantageous for communicating information that is available to one interface unit, but not the other. For example, processor power management information may be available to system interface unit 14 since system interface unit 14 interfaces to the CPU bus. However, the same information may not be observable to bus interface unit 28 since it does not interface directly to the CPU bus. However, since bus interface unit 28 may include some of the power management control circuitry, it may be necessary to communicate the CPU power management information to bus interface unit 28. Serial communication link 40 provides a mechanism for communicating such information without interfering with the operation of any of the system buses.

Figure 2:
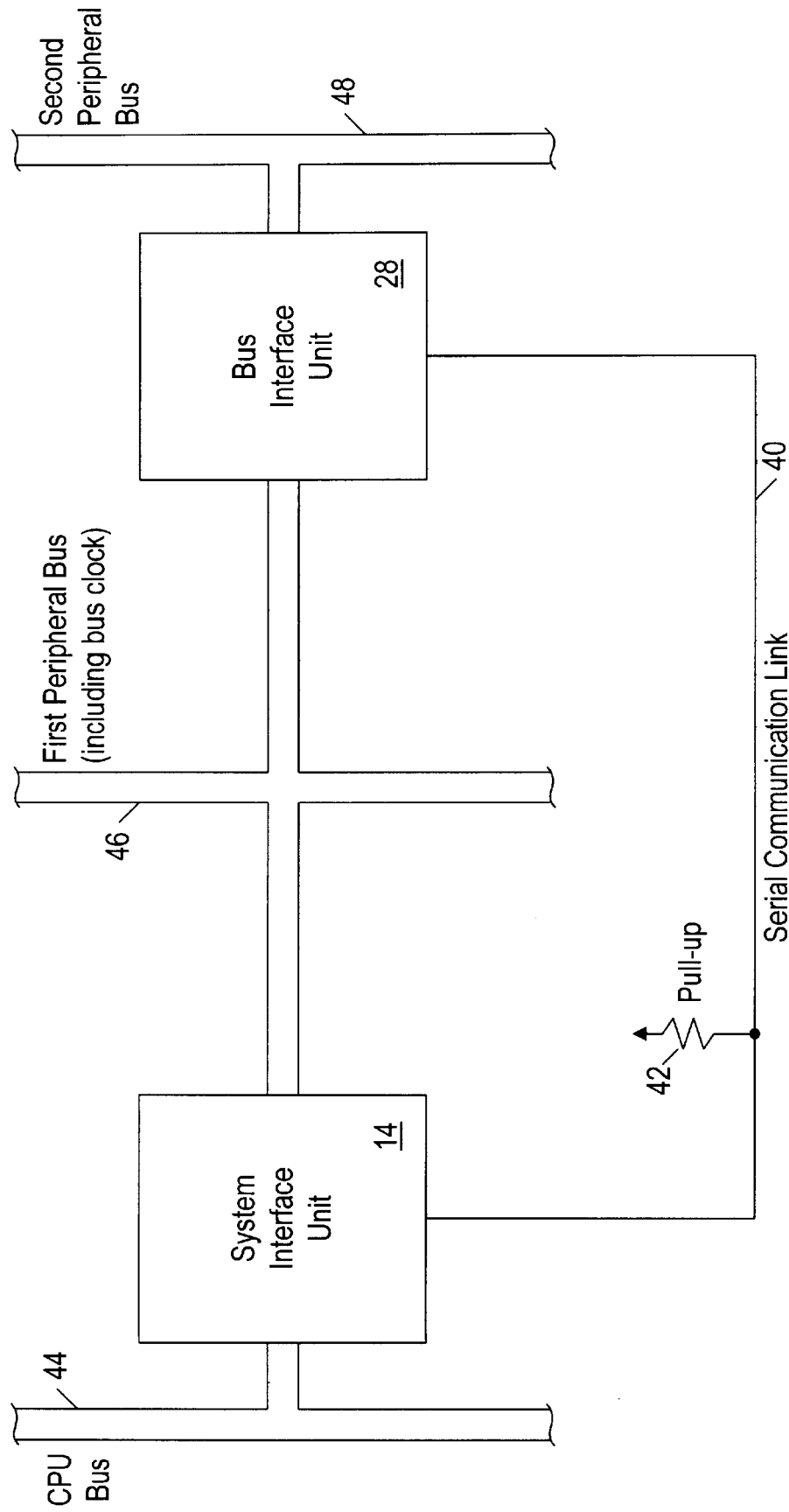
FIG. 2 diagram of a serial communication link between a system interface unit and bus interface unit in a computer system.

Turning now to FIG. 2, a block diagram is provided illustrating the serial communication link 40 between system interface unit 14 and bus interface unit 28. System interface unit 14 interfaces to CPU bus 44 and first peripheral bus 46. Bus interface unit 28 interfaces to first peripheral bus 46 and second peripheral bus 48. As mentioned above, the serial communication link 40 may be a "one wire" connection between system interface unit 14 and bus interface unit 28. Preferably, a common clock signal already available to both interface units for other purposes, such as the bus clock for first peripheral bus 46, may be used to synchronize operation of serial communication link 40. For example, if first peripheral bus 46 is the PCI bus, commands sent across serial communication link 40 may be synchronized to the PCI clock. In this case signal transitions on serial communication link 40 may occur, for example, on the positive edge of the PCI clock. Before beginning communications across serial communication link 40, both system interface unit 14 and bus interface unit 20 must be out of reset. In a preferred embodiment, system interface unit 14 initializes (and synchronized) the serial communication link 40 by transmitting an initialization command to bus interface unit 28 across serial communication link 40. Before initializing serial communication link 40, system interface unit 14 must be assured that both interface units 14 and 28 are out of reset. This may easily be accomplished if both interface units 14 and 28 are reset by a common reset signal or if one of the interface units controls reset of the other.

Upon receiving the initialization command from system interface unit 14, bus interface unit 28 sends a command to system interface unit 14. System interface unit 14 may then send a command to bus interface unit 28. The interface units 14 and 28 may continue alternating commands until they are reset.

Thus, serial communication link 40 may provide a communication link between interface units 14 and 28 where the interface units alternate between sending and receiving commands. Since the communication link may be synchronized to a common clock signal, and since the interface units 14 and 28 know to alternate between sending and receiving commands, no additional address or synchronization information need be communicated. Interface units 14 and 28 may simple trade commands back and forth in a ping pong type fashion. After receiving a command, the interface unit 14 or 28 that receives the command may wait for a turnaround period before sending its command. Similarly, the interface unit 14 or 28 that sent the command does not expect to receive the beginning of a command during this turnaround period. Neither interface unit 14 nor 28 drives serial communication link 40 during this turnaround period. The turnaround period may be used to prevent bus contention on serial communication link 40. The turnaround period may last for one cycle of the common clock, e.g. one PCI clock. A pull-up device 42 may be provided to maintain a voltage level on the serial communication link 40 when the serial communication link 40 is not being actively driven. Pull-up device 42 is illustrated as a resistor in FIG. 2, but any pull-up device, such as an active pull-up, may be employed. When the serial communication link 40 is first initialized after a reset the bus may be driven high by the initializing interface unit for one clock before sending the initialization command. Alternatively, this may not be necessary if pull-up 42 has had a chance to pull the communication link 40 to a high voltage level.

As mentioned above, serial communication link 40 may be used to communicate any system or power management information between bus interface units. No particular limitation is placed on the type of information that may be communicated across serial communication link 40. In one embodiment, four bit commands are used to communicate system and power management information between system interface unit 14 and bus interface unit 28. The following table summarizes exemplary commands. A more detailed description of each command follows.

TABLE 1

| Cycle 12345 | Command | Initiator | Target | Description |
|---|---|---|---|---|
| 1111Z | NOP | Either | Either | No Operation command. Bus is idle. |
| 0100Z | SMI Start | North | South | Command from North to South that the CPU is in SM Mode. |
| 0101Z | SMI Stop | North | South | Command from North to South that the CPU is not in SM Mode. |
| 0110Z | Stop/Grant | North | South | Command from North to tell South that the CPU is in the Stop/Grant Mode |
| 0111Z | Device Wakeup | North | South | Command from North to tell South that the AGP/PCI arbitration bus is active. |

TABLE 1-continued

| Cycle 12345 | Command | Initiator | Target | Description |
|---|---|---|---|---|
| 1100Z | Secondary Arb. Disable Acknowledge | North 1 | North 0 | Command from Secondary North bridge to inform Primary North bridge that its AGP/PCI arbitration is masked. |
| 1101Z | Primary Arb. Disable Acknowledge | North 0 | South | Command from Primary North bridge to inform South bridge that all AGP/PCI bus arbitration is masked. |
| 0000Z | Mem. Off | South | North | Command to tell North to place memory out of low power mode. |
| 0001Z | Mem. On | South | North | Command to tell North to take memory out of low power mode. |
| 0010Z | Arb. Disable | South | North | Command to tell North that PCI arbiter has been disabled. |
| 0011Z | Arb. Enable | South | North | Command to tell North that PCI arbiter has bee enabled. |

0 = Logical Low
1 = Logical High
Z = High Impedance State

The SMI start command is a command for a system interface unit, or north bridge, to communicate to a bus interface unit, or south bridge, that a processor coupled to the north bridge is in a system management mode or SMM. For example, for some power management states an SMI# signal is asserted to a processor to allow the system to implement unique features. Power management logic in the south bridge device must wait for the confirmation of the completion of the SMM activity before proceeding. The south bridge expects an SMI start command followed by an SMI stop command when the SMM activity is completed. In a multiprocessor implementation, SMI start command should be issued only after all processors have issued an SMI acknowledge special cycle. Since the SMI acknowledge special cycle is only observable by the north bridge, an SMI start command is sent across the serial communication link to communicate this information to the south bridge. The SMI stop command is used to communicate the completion of SMM activity and may be issued after any processor has issued another SMI acknowledge special cycle. The above description pertains generally to the SMI# signal and system management mode of Pentium type processors (Pentium, Pentium Pro, Pentium II, K-5, K-6, etc). However, commands to communicate similar information for any type of processor may be employed.

The stop/grant command is used to communicate to the south bridge that a processor coupled to the north bridge is in a reduced power state. In one embodiment, the south bridge may place a processor in a reduced power state by asserting a STPCLK# signal to the processor. Assertion of the STPCLK# signal places the processor in a reduced power state or stop/grant state which the processor acknowledges by a special cycle. This special cycle is observable only by the north bridge. The north bridge communicates the acknowledgement to the south bridge using the stop/grant command on the serial communication link. In a multiprocessor embodiment, the north bridge may wait until all processors have acknowledged the stop/grant state. Again, this description pertains to a Pentium type processor, but a similar command may be used to communicate power management information for any processor type.

In one embodiment, the computer system may support a power management state in which system memory coupled to the system interface unit (north bridge) may be placed in a low power mode. The mem-off command is used by the south bridge to instruct the north bridge to place the memory in the low power mode. The low power mode may include powering down the system memory or, for example, shutting off the clock to synchronous memory. After the memory is placed in a low power mode , the CPU may be placed in a further lower power state, such as by asserting an SLP# signal to a Pentium II type processor.

The arbiter disable command may be used by the bus interface unit (south bridge) to indicate to the system interface unit (north bridge) that an arbiter for the peripheral bus (e.g. PCI bus) is parked and/or may instruct the system interface unit to park an arbiter under its control. The term "park" refers to the arbiter granting access to the peripheral bus to a default owner, such as a CPU. The arbiter disable command may also be sent to the north bridge to disable or park internal arbitration between, for example, an advanced graphics port and the peripheral (PCI) bus in the north bridge device. Following an arbiter disable command, the north bridge may respond with a primary arbiter disable acknowledgement command to the so u th bridge.

Some embodiments may support multiple north bridges. An example of such an embodiment is illustrated in FIG. 3 which shows a first system interface unit (north bridge) 14 interfacing to CPU bus 44 and first peripheral bus 46, and a second system interface unit (north bridge) 50 interfacing to CPU bus 52 and peripheral bus 54. Peripheral bus 54 may be the same bus as first peripheral bus 46 or a different peripheral bus. Bus interface unit 28 interfaces between first peripheral bus 46 and second peripheral bus 48. Both system interface units 14 and 50 and bus interface unit 28 are connected to serial communication link 40. In such a configuration, only one of the north bridges (system interface units) should be responsible for communicating to the south bridge (bus interface unit) that AGP/PCI bus arbitration is masked in the north bridges, in order to maintain coherency. Thus, north bridge 50 may send the secondary arbiter disable acknowledgement command to north bridge 14. Once the primary north bridge 14 knows that all north bridge arbiters are disabled, it may use the primary arbiter disable acknowledgement command to communicate to the south bridge that all north bridge arbiters are disabled or masked. The south bridge 28 detects only the primary arbiter disable command, which reflects status for both north bridges, and ignores the secondary arbiter disable acknowledgement command.

Any north bridge may drive the device wake-up command when a device coupled to a north bridge is requesting service. In response to a device wake up command, the south bridge may send a memory-on and an arbiter enable command to wake up the system and bring the CPU out of its low power state. In one embodiment, the device wake-up command may also be used as the initialization command sent by the north bridge to the south bridge after a peripheral bus reset to initialize communication on the serial communication link.

In the preferred embodiment of the serial communication link, the north bridge and south bridge devices alternate between which device is sending and receiving commands in a ping pong type fashion. The bus clock, such as the PCI clock, is used for synchronization. Thus, no address or other synchronization information is needed since each device knows to alternated between sending and receiving commands, and each bit on the serial bus is synchronized to the bus clock. However, if the north bridge or south bridge has no regular command to send, a place holder (NOP) command must be sent to maintain command synchronization on the serial communication link.

Figure 4A:
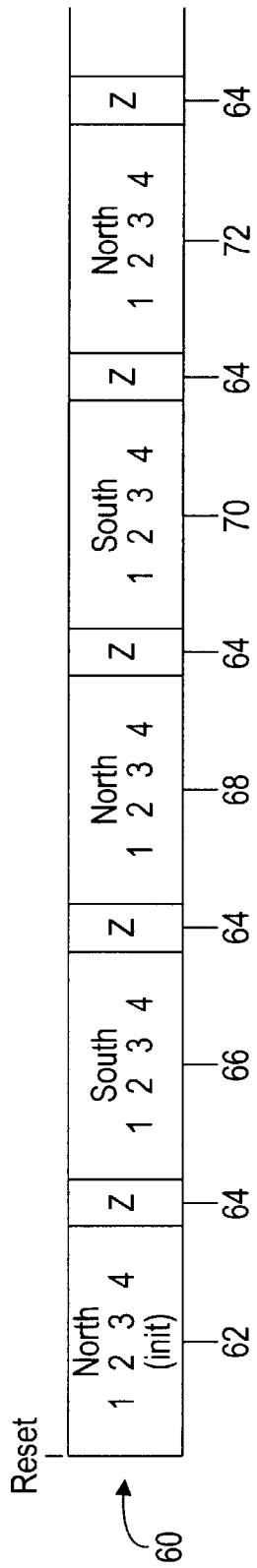
FIG. 4A is an illustration of a serial data stream illustrating the alternating command protocol of a serial communication link between a north bridge and a south bridge.

Turning now to FIG. 4A, a serial data stream 60 illustrates the alternating command protocol of the serial communication link. After a reset, the north bridge may send an initialization command 62. After the reset, the south bridge waits until it sees the initialization command from the north bridge and then it sends a command as indicated at 66. Thereafter, the north and south bridges alternate sending and receiving commands as indicated at 68 through 72. The numbers 1, 2, 3, 4 in each command refer to the four bits of a command. Of course, four-bit commands is only one embodiment. Any command length may be employed. The north and south bridge may continue alternating sending and receiving commands until another reset. A turnaround period 64 may be used between commands during which neither north nor south bridge drives the serial communication link to avoid contention between the north and south bridge drivers.

Figure 4B:
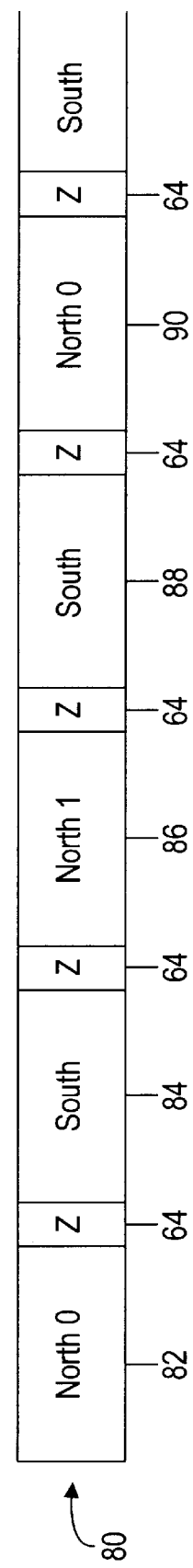
FIG. 4B is an illustration of a serial data stream illustrating the alternating command protocol of a serial communication link between multiple north bridges and a south bridge.

Turning now to FIG. 4B, data stream 80 illustrates commands being sent over the serial communication link and an embodiment employing multiple north bridges. The primary north bridge sends a command 82 followed by the south bridge sending a command 84. Then the secondary north bridge may send a command 86. The command 86 from the secondary north bridge is ignored by the south bridge and received only by the primary north bridge. Following the command 86 from the secondary north bridge the south bridge sends a command 88 followed by the primary north bridge 90 and so on. Note that in this embodiment, commands still alternate between a north bridge and a south bridge. However, the north bridge may be either the primary or secondary north bridge.

Figure 5:
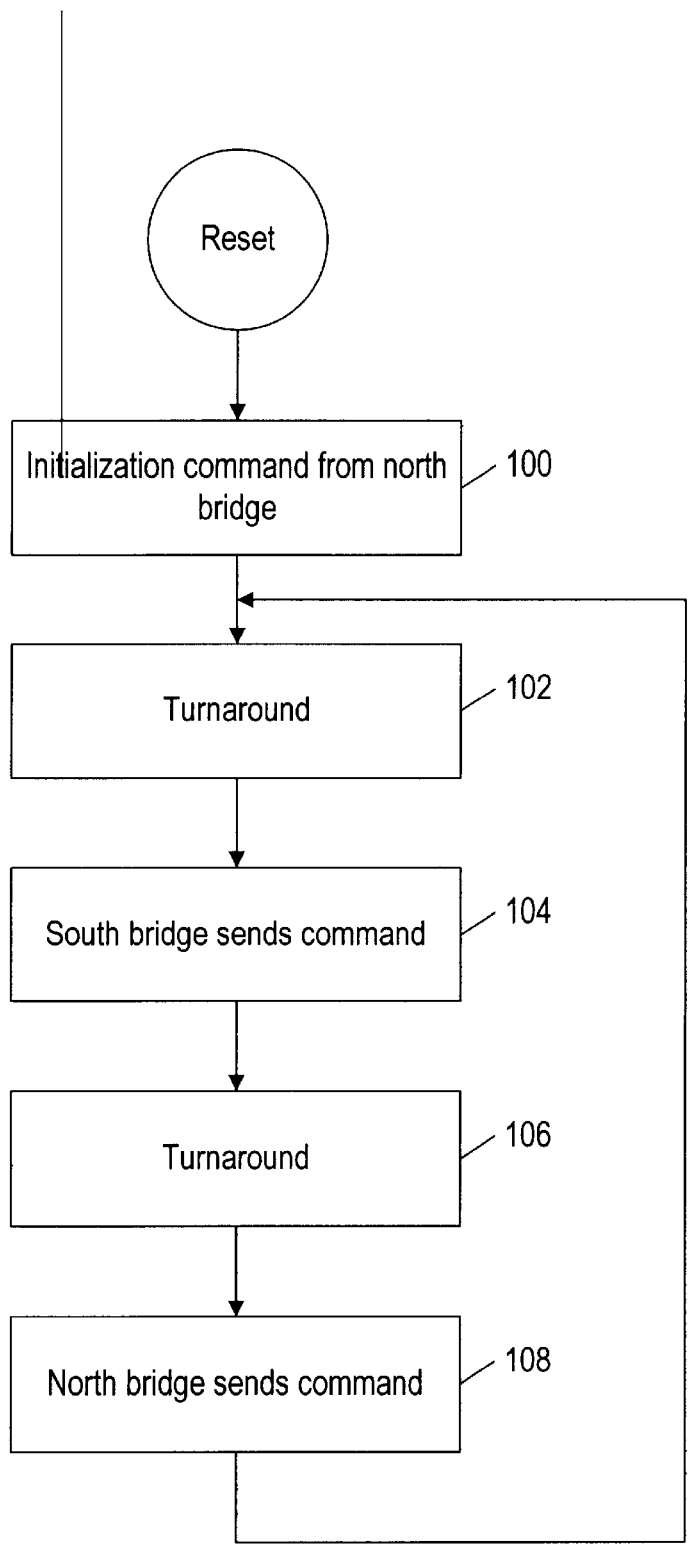
FIG. 5 flow diagram of a method for communicating information between bus interfaces in a computer system.

Turning now to FIG. 5, a method for communicating information between interface units in a computer system is illustrated. After a reset, a serial communication link between a system interface unit and a bus interface unit is initialized as indicated at 100. The system interface unit may be a north bridge type device interfacing between CPU bus and a first peripheral bus, such as a PCI bus, and the bus interface unit may be a south bridge type device interfacing between the first peripheral bus and a second peripheral bus, such as an ISA bus. Either bus interface unit may be the unit to drive the initialization command. In a preferred embodiment, the north bridge device drives the initialization command. Following the initialization command neither bus interface unit drives the serial communication link for a turnaround cycle as indicated at 102. Then the south bridge device sends a command, as indicate at 104, followed by a turnaround period, as indicated at 106. Then the north bridge sends a command across the serial communication link as indicated at 108. The south and north bridges continue alternating sending commands until another reset. The commands may communicate any information between the north and south bridge, such as system management or power management information, and may be commands such as those shown in Table 1.

The serial communication link between bus interface units has been described. While specific embodiments of commands, functionality, and protocols have been described, the invention is not limited to these specific embodiments. The serial communication link may be used to communicate any type of information in a computer system that may need to be communicated between bus interface devices. The commands, types of information, and alternating protocol described herein are merely exemplary of how such a serial communication link may be employed.

Various modifications and changes may be made as would be obvious to a person skilled in the art having the benefit of this disclosure. It is intended that the following claims be interpreted to embrace all such modifications and changes and, accordingly, the specifications and drawings are to be regarded in an illustrative rather than a restrictive sense.

What is claimed is:

1. A computer system, comprising:
   a system interface unit configured to interface a processor bus to a first peripheral bus;
   a bus interface unit configured to interface said first peripheral bus to a second peripheral bus;
   a serial communication link between said system interface unit and said bus interface unit;
      said system interface unit and said bus interface unit are further configured to communicate with each other across said serial communication link;
   a graphics device coupled to said system interface unit; and
   a display monitor for displaying images to a user of the computer system, wherein
      said display monitor is coupled to said graphics device.

2. The computer system as recited in claim 1, wherein said system interface unit and said bus interface unit are configured to communicate with each other across said serial communication link by sending commands across said serial communication link, wherein said system interface unit and bus interface unit are configured to alternate after each command between which device is sending and which device is receiving a command.

3. The computer system as recited in claim 1, wherein said system interface unit and said bus interface unit are configured to synchronize sending and receiving commands across said serial communication link to a common clock reference.

4. The computer system as recited in claim 3, wherein said common clock reference is a bus clock for said first peripheral bus.

5. The computer system as recited in claim 4, wherein said first peripheral bus comprises a Peripheral Component Interconnect (PCI) bus.

6. The computer system as recited in claim 1, wherein said system interface unit and said bus interface unit are configured to communicate with each other across said serial communication link by sending commands across said serial communication link, wherein said system interface unit and bus interface unit are configured to alternate after each command between which device is sending and which device is receiving a command, wherein neither said system interface unit nor said bus interface unit drives said serial communication link for a turnaround period after a command is sent.

7. The computer system as recited in claim 6, further comprising a pull-up device on said serial communication link to pull said serial communication link to a high voltage when said serial communication link is not actively driven.

8. The computer system as recited in claim 1, wherein said serial communication link is a single connection between one conductor on said system interface unit and one conductor on said bus interface unit.

9. The computer system as recited in claim 1, wherein said system interface unit and said bus interface unit are configured to communicate system information across said serial communication link.

10. The computer system as recited in claim 9, wherein said system information includes power management information.

11. The computer system as recited in claim 1, wherein said system interface unit and said bus interface unit are configured to communicate by sending and receiving commands across said serial communication link.

12. The computer system as recited in claim 11, wherein said commands include a command for said system interface unit to communicate to said bus interface unit that a processor coupled to said processor bus is in a system management mode.

13. The computer system as recited in claim 11, wherein said commands include a command for said system interface unit to communicate to said bus interface unit that a processor coupled to said processor bus is not in a system management mode.

14. The computer system as recited in claim 11, wherein said commands include a command for said system interface unit to communicate to said bus interface unit that a processor coupled to said processor bus is in a reduced power state.

15. The computer system as recited in claim 11, wherein said commands include a command for said bus interface unit to communicate to said system interface unit to place system memory coupled to said system interface unit in a low power mode.

16. The computer system as recited in claim 11, wherein said commands include a command for said bus interface unit to communicate to said system interface unit to take system memory coupled to said system interface unit out of a low power mode.

17. The computer system as recited in claim 11, wherein said system interface unit is further configured to interface to a graphics bus and to arbitrate between memory access requests from said graphics bus and said first peripheral bus, wherein said commands include a command for said system interface unit to communicate to said bus interface unit that arbitration between said graphics bus and said first peripheral bus is masked.

18. The computer system as recited in claim 11, wherein said commands include a command for said system interface unit to communicate to said bus interface unit that a device coupled to said system interface unit is requesting service.

19. The computer system as recited in claim 18, wherein said command is sent by said system interface unit to said bus interface unit to initialize said serial communication link after a reset.

20. The computer system as recited in claim 11, wherein said commands include a command for said bus interface unit to communicate to said system interface unit to disable or park an arbiter.

21. The computer system as recited in claim 11, wherein said commands include a command for said bus interface unit to communicate to said system interface unit that an arbiter for said first peripheral bus is unparked.

22. The computer system as recited in claim 11, wherein said commands include a no operation command sent as a placeholder by said system interface unit or said bus interface unit when the sender has no other command to send.

23. A computer bus hierarchy, comprising:
   a system interface unit configured to interface a processor bus to a first peripheral bus;
   a bus interface unit configured to interface said first peripheral bus to a second peripheral bus; and
   a serial communication link between said system interface unit and said bus interface unit;
      said system interface unit and said bus interface unit are further configured to communicate with each other across said serial communication link.

24. The computer bus hierarchy as recited in claim 23, wherein said system interface unit and said bus interface unit are configured to communicate with each other across said serial communication link by sending commands across said serial communication link, wherein said system interface unit and bus interface unit are configured to alternate after each command between which device is sending and which device is receiving a command.

25. The computer bus hierarchy as recited in claim 23, wherein said system interface unit and said bus interface unit are configured to synchronize sending and receiving commands across said serial communication link to a common clock reference.

26. The computer bus hierarchy as recited in claim 25, wherein said common clock reference is a bus clock for said first peripheral bus.

27. The computer bus hierarchy as recited in claim 26, wherein said first peripheral bus comprises a Peripheral Component Interconnect (PCI) bus.

28. The computer bus hierarchy as recited in claim 23, wherein said system interface unit and said bus interface unit are configured to communicate with each other across said serial communication link by sending commands across said serial communication link, wherein said system interface unit and bus interface unit are configured to alternate after each command between which device is sending and which device is receiving a command, wherein neither said system interface unit nor said bus interface unit drives said serial communication link for a turnaround period after a command is sent.

29. The computer bus hierarchy as recited in claim 28, further comprising a pull-up device on said serial communication link to pull said serial communication link to a high voltage when said serial communication link is not actively driven.

30. The computer bus hierarchy as recited in claim 23, wherein said serial communication link is a single connection between one conductor on said system interface unit and one conductor on said bus interface unit.

31. The computer bus hierarchy as recited in claim 23, wherein said system interface unit and said bus interface unit are configured to communicate system information across said serial communication link.

32. The computer bus hierarchy as recited in claim 31, wherein said system information includes power management information.

33. The computer bus hierarchy as recited in claim 23, wherein said system interface unit and said bus interface unit are configured to communicate by sending and receiving commands across said serial communication link.

34. The computer bus hierarchy as recited in claim 33, wherein said commands include a command for said system interface unit to communicate to said bus interface unit that a processor coupled to said processor bus is in a system management mode.

35. The computer bus hierarchy as recited in claim 33, wherein said commands include a command for said system interface unit to communicate to said bus interface unit that a processor coupled to said processor bus is not in a system management mode.

36. The computer bus hierarchy as recited in claim 33, wherein said commands include a command for said system interface unit to communicate to said bus interface unit that a processor coupled to said processor bus is in a reduced power state.

37. The computer bus hierarchy as recited in claim 33, wherein said commands include a command for said bus interface unit to communicate to said system interface unit to place system memory coupled to said system interface unit in a low power mode.

38. The computer bus hierarchy as recited in claim 33, wherein said commands include a command for said bus interface unit to communicate to said system interface unit to take system memory coupled to said system interface unit out of a low power mode.

39. The computer bus hierarchy as recited in claim 33, wherein said system interface unit is further configured to interface to a graphics bus and to arbitrate between memory access requests from said graphics bus and said first peripheral bus, wherein said commands include a command for said system interface unit to communicate to said bus interface unit that arbitration between said graphics bus and said first peripheral bus is masked.

40. The computer bus hierarchy as recited in claim 33, wherein said commands include a command for said system interface unit to communicate to said bus interface unit that a device coupled to said system interface unit is requesting service.

41. The computer bus hierarchy as recited in claim 40, wherein said command is sent by said system interface unit to said bus interface unit to initialize said serial communication link after a reset.

42. The computer bus hierarchy as recited in claim 33, wherein said commands include a command for said bus interface unit to communicate to said system interface unit that an arbiter for said first peripheral bus is parked.

43. The computer bus hierarchy as recited in claim 33, wherein said commands include a command for said bus interface unit to communicate to said system interface unit that an arbiter for said first peripheral bus is unparked.

44. The computer system as recited in claim 33, wherein said commands include a no operation command sent as a placeholder by said system interface unit or said bus interface unit when the sender has no other command to send.

45. A method for communicating information between interface units in a computer system, the method comprising:
sending a first command from a system interface unit to a bus interface unit on a serial communication link between said system and bus interface units in the computer system;
sending a second command from said bus interface unit to said system interface unit on said serial communication link after said sending a first command; and
continuing sending commands between said system and bus interface units, wherein said system and bus interface units alternate after each command between which interface unit is receiving and which is sending a command.

46. The method as recited in claim 45, further comprising initializing said serial communication link after a reset by said system interface unit sending an initialization command to said bus interface unit.

47. The method as recited in claim 45, wherein said system interface unit interfaces a processor bus to a first peripheral bus, and said bus interface unit interfaces said first peripheral bus to a second peripheral bus.

48. The method as recited in claim 45, wherein said serial communication link is synchronized to a common clock received by said system and bus interface units.

49. The method as recited in claim 48, wherein neither said system nor said bus interface unit drives said serial communication link for one common clock period after each command is sent.

50. The method as recited in claim 45, wherein said serial communication link is a single conductor connection between said system and bus interface units.

51. The method as recited in claim 45, wherein said commands are four bits in length.

52. A method for communicating information between interface units in a computer system, the method comprising:

placing a CPU in a low power state;

sending, on a serial communication link between a system interface unit and a bus interface unit, a CPU low power command from said system interface unit to said bus interface unit, wherein said system interface unit is coupled to said CPU, wherein said CPU low power command informs said bus interface unit that said CPU is in said low power state; and sending, on said serial communication link, a memory off command from said bus interface unit to said system interface unit to instruct said system interface unit to place system memory coupled to said system interface unit in a reduced power state.

53. The method as recited in claim 52, further comprising sending, on said serial communication link, a system management start command from said system interface unit to said bus interface unit, wherein said system management start command informs said bus interface unit that said CPU is in a system management mode.

54. The method as recited in claim 52, further comprising sending, on said serial communication link, a system management stop command from said system interface unit to said bus interface unit, wherein said system management stop command informs said bus interface unit that said CPU is out of a system management mode.

55. The method as recited in claim 52, further comprising sending, on said serial communication link, a device wakeup command from said system interface unit to said bus interface unit, wherein said device wakeup command informs said bus interface unit that a device coupled to said system interface unit is requesting service.

56. The method as recited in claim 52, further comprising sending, on said serial communication link, a memory on command from said bus interface unit to said system interface unit to instruct said first interface unit to place system memory coupled to said system interface unit in a full power state.

57. The method as recited in claim 52, further comprising sending, on said serial communication link, an arbiter parked command from said bus interface unit to said system interface unit to inform said first interface unit a bus arbiter in said second interface unit is parked.

* * * * *